United States Patent
Stark et al.

(10) Patent No.: US 9,195,347 B2
(45) Date of Patent: Nov. 24, 2015

(54) INPUT DEVICE AND ASSOCIATED METHOD

(75) Inventors: Laurence Stark, Edinburgh (GB); William Halliday, Edinburgh (GB)

(73) Assignee: STMICROELECTRONICS (RESEARCH & DEVELOPMENT) LIMITED, Marlow Bucks (GB)

(*) Notice: Subject to any disclaimer, the term of this patent is extended or adjusted under 35 U.S.C. 154(b) by 366 days.

(21) Appl. No.: 13/306,085

(22) Filed: Nov. 29, 2011

(65) Prior Publication Data
US 2012/0194479 A1 Aug. 2, 2012

(30) Foreign Application Priority Data
Nov. 30, 2010 (GB) .................................. 1020282.8

(51) Int. Cl.
G06F 3/042 (2006.01)

(52) U.S. Cl.
CPC .... *G06F 3/0428* (2013.01); *G06F 2203/04108* (2013.01)

(58) Field of Classification Search
CPC .................. G06F 2203/04108; G06F 3/0428
USPC .................... 345/174–177; 356/498
See application file for complete search history.

(56) References Cited

U.S. PATENT DOCUMENTS

| | | | |
|---|---|---|---|
| 5,825,481 A | 10/1998 | Alofs et al. | |
| 6,812,964 B1 | 11/2004 | Tani | |
| 7,262,402 B2 | 8/2007 | Niclass | |
| 7,301,608 B1 * | 11/2007 | Mendenhall et al. | ........ 356/4.01 |
| 7,896,498 B2 * | 3/2011 | Munger et al. | ................ 351/221 |
| 2003/0080298 A1 * | 5/2003 | Karplus et al. | ............. 250/370.1 |
| 2005/0052635 A1 | 3/2005 | Xie | |
| 2005/0156888 A1 | 7/2005 | Xie | |
| 2007/0109527 A1 | 5/2007 | Wenstrand | |
| 2007/0182949 A1 | 8/2007 | Niclass | |
| 2008/0192015 A1 | 8/2008 | Lieberman | |
| 2009/0057410 A1 * | 3/2009 | Kotlarsky et al. | ........ 235/462.07 |
| 2009/0243999 A1 * | 10/2009 | Satou | ............................ 345/156 |
| 2009/0292196 A1 * | 11/2009 | Eckert et al. | .................. 600/407 |
| 2010/0015728 A1 * | 1/2010 | Dilleen et al. | ................. 436/536 |
| 2010/0245764 A1 * | 9/2010 | Munger et al. | ................ 351/206 |
| 2010/0294919 A1 * | 11/2010 | Kardynal et al. | .......... 250/214.1 |
| 2010/0295821 A1 | 11/2010 | Chang et al. | |
| 2011/0086676 A1 * | 4/2011 | Choi et al. | .................... 455/567 |
| 2011/0096024 A1 * | 4/2011 | Kwak | ........................... 345/174 |
| 2011/0096033 A1 * | 4/2011 | Ko | ................................... 345/175 |
| 2011/0133059 A1 * | 6/2011 | Kim et al. | ................. 250/214 R |
| 2011/0134079 A1 * | 6/2011 | Stark | ............................. 345/175 |
| 2011/0141066 A1 * | 6/2011 | Shimotani et al. | ............ 345/177 |

FOREIGN PATENT DOCUMENTS

| | | |
|---|---|---|
| CN | 1170869 | 1/1998 |
| EP | 1231502 | 8/2002 |
| WO | 2008068607 | 6/2008 |
| WO | 2009124601 | 10/2009 |

* cited by examiner

*Primary Examiner* — Quan-Zhen Wang
*Assistant Examiner* — Tony Davis
(74) *Attorney, Agent, or Firm* — Allen, Dyer, Doppelt, Milbrath & Gilchrist, P.A.

(57) ABSTRACT

An input device for an electronic device includes a proximity detector and a light source. The light source transmits light to a sensing area, which is reflected back to the proximity detector in the presence of an object in the vicinity of the sensing area, such that the proximity detector can produce an output indicative of a distance of the object from the proximity detector to give rise to a control signal for controlling the device.

21 Claims, 4 Drawing Sheets

INPUT DEVICE AND ASSOCIATED METHOD

FIELD OF THE INVENTION

The present invention relates to an improved input device and associated method.

BACKGROUND OF THE INVENTION

A single photon avalanche diode (SPAR) is based on a p-n junction device biased beyond its breakdown region. The high reverse bias voltage generates a sufficient magnitude of electric field such that a single charge carrier introduced into the depletion layer of the device can cause a self-sustaining avalanche via impact ionisation. The avalanche is quenched, either actively or passively to allow the device to be "reset" to detect further photons. The initiating charge carrier can be photo-electrically generated by a single incident photon striking the high field region. It is this feature which gives rise to the name "Single Photon Avalanche Diode". This single photon detection mode of operation is often referred to as "Geiger Mode".

U.S. Pat. No. 7,262,402 discloses an imaging device using an array of SPADs for capturing a depth and intensity map of a scene, when the scene is illuminated by an optical pulse.

US 2007/0182949 discloses an arrangement for measuring the distance to an object. The arrangement uses a modulated photonic wave to illuminate the object and an array of SPADE to detect the reflected wave. Various methods of analysis are disclosed to reduce the effects of interference in the reflected wave. In the domain of input devices there is a push towards touch screens and the like. Touch screen technology is fundamentally limited in the accuracy which a user can achieve. For example, the user's finger, stylus, or other touching object will obstruct the user's view of the display thereby reducing the accuracy which a user can achieve. In addition, the mapping between a touch sensitive user interface and a device display for intuitive user operation may use a 1:1 location mapping between a touch sensitive user interface and a device display—this can result in a user interface which is too small to operate accurately.

These issues can be eliminated by locating a touch sensitive user interface such as a track pad at a position not overlaying the screen and hence not implying 1:1 location mapping. However, this uses additional area on the device, rendering it impractical for mobile devices (such as, but not limited to, mobile phones, laptops and tablet PCs) where space is often at a premium.

An additional problem is that the cost of a touch screen and a track pad increase in proportion to their area. This is because the hardware needed to detect a user's input needs to be present across the entire area of the touch screen or track pad.

One attempt to address this issue has been to use virtual projected keyboards which use conventional optics to project the location of a key and to produce a depth map of a scene to determine if a user has interacted with a projected key. However these have not proved successful for a number of reasons.

In particular although conventional 3D cameras are able to produce a depth map of a scene, they are expensive, bulky, have high power consumption and require very high data bandwidth operating at the high frame rates used for low-latency response times essential for user perception of system performance.

The Microsoft Kinect™ system uses light matrix scattering detection techniques to produce a depth map of a scene, but requires heavy data processing, is physically large, and can only achieve a 30 Hz frame rate which compromises accuracy of object tracking. Projection keyboards utilise a similar method of detection but are also limited in frame rate, e.g. Canestra™ Electronic Perception Technology (EPT) keyboard can sense "up to 400 characters per minute" (6.667 per second).

In addition, most widely used touch screen technologies use either components mounted on more than one side of the sensing area, or an overlay for the parent device display which rules out their use for sensing in an area not on a solid surface and restricts their sensing area to an area on the parent device.

As a result of these issues, virtual projected keyboards have been expensive, limited to operating in an imaging mode, have higher bandwidth and processing requirements, and limited due to the need to project onto a hard, non-reflective surface to work.

It is an object of the present invention to overcome at least some of the issues associated with the prior art. It is a still further object of the present invention to provide an alternative to a touch screen as an interface mechanism or input device.

SUMMARY OF THE INVENTION

According to one aspect there is an input device for a device, the input device including a proximity detector and a light source. The light source transmits light to a sensing area, which is reflected back to the proximity detector in the presence of an object in the vicinity of the sensing area, such that the proximity detector can produce an output indicative of a distance of the object from the proximity detector to give rise to a control signal for controlling the device Optionally, the input device comprises at least two proximity detectors located remotely from one another. A first proximity detector produces an output indicative of a first distance, the first distance being the distance between the first proximity detector and the object. A second proximity detector produces an output indicative of a second distance, the second distance being the distance between the second proximity detector and the object.

Optionally, a processor calculates a two dimensional position of the object based the first distance, the second distance, and the distance between the first and second proximity detectors.

Optionally, the processor provides the two dimensional position of the object as the Cartesian coordinates of a plane having its origin located at the first proximity detector, wherein the x-axis passes through the second proximity detector.

Optionally, the x-coordinate of the object is given by $$\frac{r_1^2 - r_2^2 + d^2}{2d}$$

and the y-coordinate of the object is given by $$\sqrt{r_1^2 - \left(\frac{r_1^2 - r_2^2 + d^2}{2d}\right)}$$

wherein $r_1$ is the first distance, $r_2$ is the second distance and d is the distance between the photo detectors.

Optionally, the proximity detector comprises a SPAD. Optionally, the proximity detector comprises an array of SPADs. Optionally, the array of SPADs comprises a plurality of SPADs arranged in rows and columns.

Optionally, the array of SPADs is connected to a multiplex and a counter to enable measurement of the reflected illumination.

Optionally, the output from the proximity detector is passed to an operating system of the device to effect one or more control functions. Optionally, the proximity detector detects the phase of the light which is reflected by the object.

Optionally, each proximity detector is associated with a light source and each proximity detector and its associated light source are located proximate to each other.

Optionally, the proximity detector includes a colour filter. Optionally, the proximity detector further comprises a phase plate. Optionally, the light source is adapted to transmit non-visible light.

According to another aspect of the present invention there is provided a device comprising an input device in accordance with the previously described aspect of the present invention.

Optionally, the device is a telephone. Optionally, the device is a computer.

According to a further aspect of the present invention there is a method of controlling a device using an input device including a proximity detector and a light source. The method comprises transmitting light from a light source to a sensing area, receiving at the proximity detector light reflected by an object in the vicinity of the sensing area, deriving an output indicative of a distance of the object from the proximity detector, and providing a control signal based on the output to the device.

Optionally, the input device comprises at least two proximity detectors located remote from one another, and the method further comprises using a first proximity detector to derive an output indicative of a first distance, the first distance being the distance between said first proximity detector and said object, and using a second proximity detector to derive an output indicative of a second distance, the second distance being the distance between the second proximity detector and the object.

Optionally, the method further comprises calculating a two dimensional position of the object based the first distance, the second distance, and the distance between the first and second proximity detectors.

Optionally, the calculating step provides the two dimensional position of the object as the Cartesian coordinates of a plane having its origin located at the first proximity detector, wherein the x-axis passes through the second proximity detector.

Optionally, the x-coordinate of the object is calculated by $$\frac{r_1^2 - r_2^2 + d^2}{2d}$$

and the y-coordinate of the object is calculated by $$\sqrt{r_1^2 - \left(\frac{r_1^2 - r_2^2 + d^2}{2d}\right)}$$

wherein $r_1$ is the first distance, $r_2$ is the second distance and d is the distance between the photo detectors.

The proposed invention is able to locate an object within an area outside of the device without it being necessary for the object to contact a solid surface and can be positioned so as not to imply 1:1 location mapping whilst using no additional device space. Because of this, the system is able to provide mouse style control and accuracy for parent devices without the space requirements of a track pad or additional peripherals such as a mouse or stylus.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
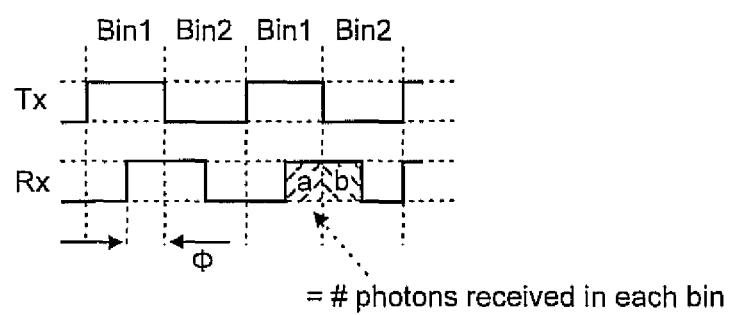
FIG. 1 is a diagram for illustrating the determination of phase shift in a SPAD, in accordance with an embodiment of the invention.

A SPAD can be used as in a ranging application through the application of a Phase Shift Extraction Method for range determination, although alternative methods exist for range determination using SPADs based on direct time of flight measurement. The term ranging in this application is intended to cover all ranging devices and methods including by not limited to ranging devices, proximity devices accelerometers etc. Ranging can occur in a number of applications, including proximity detection which is relative easy to implement and inexpensive. Laser ranging which is more complex and costly than a proximity detector, and three-dimensional imaging which is a high-end application that could be used to recognize gestures and facial expressions.

A proximity sensor is the most basic of the ranging applications. At its simplest the sensor is capable of indicating the presence or absence of a user or object by detecting the presence or absence of a reflected signal. Additional computation and illuminator complexity can provide enhanced data such as the range to an object. A typical range is of the order 0.01 m to 0.5 m. In a simple proximity sensor the illumination source could be a modulated LED, at a wavelength of about 850 nm.

The next application group is that of laser ranging, where the illumination source is a modulated diode laser. Performance can range from <1 cm to 20 m range (and higher for top end systems) with millimetric accuracy. Requirements on optics are enhanced, with hemispherical lenses and narrow bandpass filters being required. A near-field return may results in the introduction of parallax error, i.e. movement of the returned laser spot over the sensor pixel array dependent on distance to object. To overcome these problems the ranger includes calibration functions to enable the subtraction of the electronic and optical delay through the host system. The illumination source wavelength should be visible so that the user can see what is being targeted and is typically around 635 nm.

The third application group is that of 3D cameras. In this application a pixel array is used in order to avoid mechanical scanning of the array. Systems can be based on a number of different architectures. Both time of flight (TOF) and modulated illuminator based architectures are used, however, the latter is more robust to ambient light and thus fits best with established photodiode construction. Additional features such as face and gesture recognition are applications of this type of ranging device.

Most optical ranging implementations use either stereoscopic, structured light, direct time of flight or phase extraction methods in order to ascertain the range to a target. Stereoscopic approaches use two conventional cameras, and can have a heavy computation overhead in order to extract range. The structured light scheme uses diffractive optics and the range is computed using a conventional camera based on how a known projected shape or matrix of spots is deformed as it strikes the target. The direct time of flight (TOF) method uses a narrow pulsed laser, with a time-digital converter (TDC) measuring the difference in time between transmission and first photon reception. Commonly, a 'reverse mode' is employed, where the TDC measures the back-portion of time, i.e. the time from first photon reception to next pulse transmission. This scheme minimizes system activity to only the occasions where a photon is detected, and is therefore well matched to tightly controlled, low photon flux levels and medical applications such as fluorescent lifetime microscopy (FLIM).

The phase extraction method is probably the most commonly used method as it is well suited to systems which implement computation of the generalized range equation using existing photodiode technology. It is also robust to background ambient light conditions, and may be adapted to allow for varying illuminator modulation wave-shapes (i.e. sinusoidal or square). This scheme is favoured for SPADs in proximity detection applications. The present invention takes advantage of the fact that the phase extraction method system incorporates an inherent ambient light level detection function which can be used in conjunction with a SPAD.

It is important to understand the range equation derivation as it indicates the ease of applicability of SPADs to phase extraction proximity detection and ranging solutions. It also aids in the understanding of inherent features such as ambient light metering and measuring a depth of interest for a specific purpose.

Distance is determined from the speed of light and TOF, as follows:

$$s = ct$$

where s is distance, c the speed of light and t is time. For a ranging system however, the distance is doubled due to the fact there are send and receive paths. As such the distance measured in a ranging system s is given by:

$$s = \tfrac{1}{2} ct$$

The time shift component (='t') due to the photon TOF, is dependent on the modulation frequency and phase shift magnitude of the waveform. As such,
t=% shift of the returned waveform×$t_{mod\_period}$ and if $t_{mod\_period}=1/f_{mod}$:

$$\Rightarrow t = \frac{\phi}{2\pi} \circ \frac{1}{f}$$

$$\Rightarrow t = \frac{\phi}{2\pi \circ f}$$

The units are in radians. Then by substituting the above equation back into the starting equation: the 'range equation' is expressed as $$\Rightarrow s = \frac{c \circ \phi}{4\pi \circ f}$$

The critical component in this equation is φ, which is the unknown component of the % shift of the returned waveform. The following section discusses how this can be determined.

Figure 2:
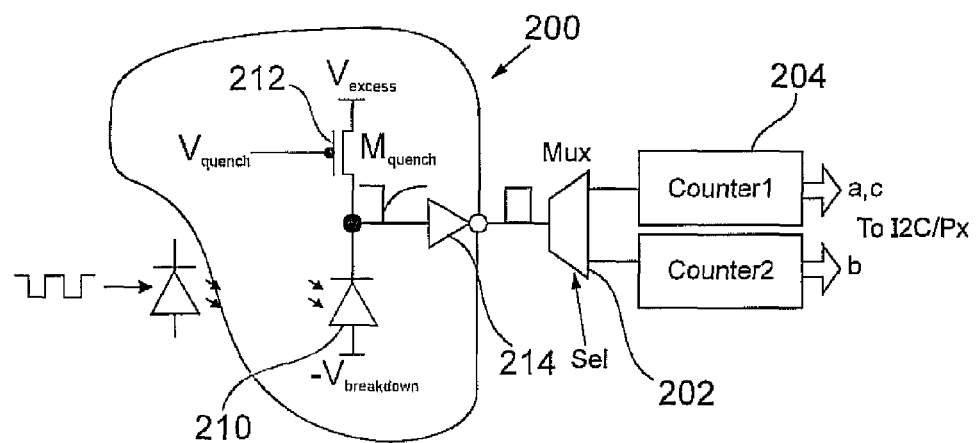
FIG. 2 is a diagram of a SPAD and associated timing diagram, in accordance with an embodiment of the invention.
Figure 2:
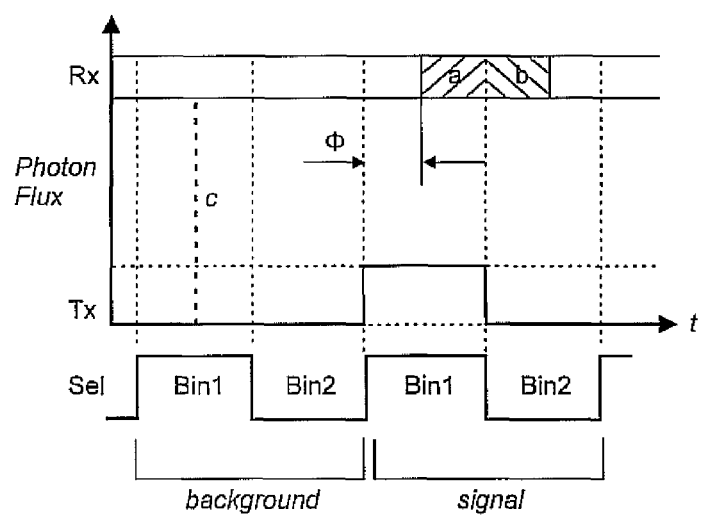

Since the values of c, f and n are constants, the range result simply scales with φ, (the % shift of the received light waveform in relation to that which was transmitted). FIG. 2 demonstrates how φ may be determined for a system employing a square wave modulated illuminator. The transmitted and received waveforms are shifted from one another by φ. By measuring the photons that arrive in "a" and "b" in bins 1 and 2 respectively the value of φ can be determined as follows:

$$\frac{\phi}{2\pi} = \frac{b_{count}}{(a+b)_{count}}$$

In this type of system there is a range limit set by the illuminator modulation frequency, which is known as the unambiguous range. Photons received from targets that are further away than this range can introduce an aliasing error by erroneously appearing in a legitimate bin for a subsequent measurement. Since determination of range is enabled by the modulation process, it is desirable to maximize the number of edges of the modulation waveform in order to accumulate data for averaging purposes as fast as possible. However, a high modulation frequency may lower the unambiguous range and introduces more technical complexity in the illuminator driver circuitry. Therefore, two or more different modulation frequencies may be interleaved or used intermittently, so as to reduce or negate the impact of aliased photons via appropriate data processing.

FIG. 2 illustrates a possible implementation of a SPAD based proximity sensor with an associated waveform diagram. FIG. 2 shows a SPAD 200 connected to a multiplexer 202. The output from the multiplexer passes through counters 1 and 2 (204). The SPAD device shown generally at 200 is of a standard type, including a photo diode 210, a p-type MOSFET 212 and a NOT gate 214.

The timing waveforms are shown in such a way so as to represent the relative photon arrival magnitudes. It can be seen that an extra phase has been added to enable computation of the background ambient light level offset 'c', although this can be significantly reduced by the use of a narrow optical band-pass filter matched to the illuminator wavelength if necessary. The element 'c' is then accommodated in the computation of received light phase shift φ. The computed results for a, b, c are determined and written into either a temporary memory store or an I2C register. The computation of the phase shift φ, is calculated as follows:

$$\phi = \frac{a_{count} - c}{(a+b)_{count} - 2c}$$

The predetermined selection of modulation frequency is performed by dedicated logic or host system which selects a suitable frequency or frequencies for the application of the range sensor. The range sensor of FIG. 2 is dependent on the amount of light that can be transmitted on to the scene, system power consumption and the target reflectivity. Since the system shown in FIG. 2 computes the background light condition in order to ascertain the offset of the returned light pulse from the target, ambient light metering is included. A simplified timing scheme is employed if the ambient light level data is required, since the target illumination cycle is not necessary. If a narrow band IR filter is employed in the optical path the value of c will represent only the content of the filter passband. This can then be extrapolated to an approximation of the general ambient light conditions.

Figure 3:
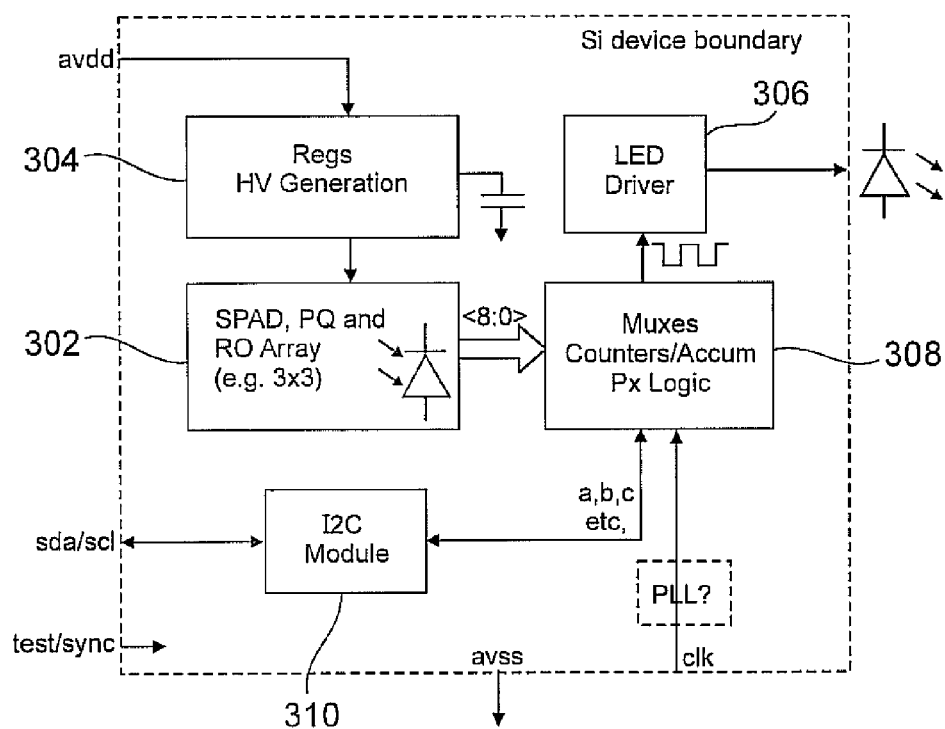
FIG. 3 is a block diagram of a proximity detector, in accordance with an embodiment of the invention.

Referring to FIG. 3 a block diagram of a proximity sensor is shown. The proximity sensor 300 includes SPAD function and the quenching thereof in block 302. The quenching can be passive as shown or of any other suitable type. The bias voltage for the SPAD may be provided by a charge pump or any other suitable device 304. The sensor module also includes an LED or other illumination source and an associated driver 306 to ensure that the appropriate modulation is applied to the illumination source.

The sensor may include a distance computation logic module to determine range. Alternatively this can be located in a host device in which the range sensor is used. The sensor also includes multiplexers and counters 308 and a storage means 310, such as a I2C module. The sensor may also include a Phase Locked Loop (PLL) for clocking and subsequent timed signal generation purposes.

The power consumption of SPADs and their readout circuits is dependent on the incident photon arrival rate. The average power consumption of a ranging system could be reduced by using power saving modes such as pulsed on/off operation, at a rate of ~10 Hz for example, at the expense of target motion distortion.

The sensor may be implemented on a 1 mm$^2$ die size and the I2C module could also be implemented on an appropriate die. The I2C module can either be integrated into the same die as the sensor or implemented on a separate second die. The sensor may include an optical package, an integral IR bandpass Filter (either coating or inherent in the optical elements) and an optimal field of view of about 30°. As the sensor is not intended to "create an image" but is instead used to help ensure that as many photons as possible are detected the optics could be made from injection moulded hemispherical elements.

The illuminator source should ideally be of a non-visible wavelength, for example in the Near Infra Red (NIR) band, such as 850 nm.

It should be noted that the terms "optical", "illumination" and "light" are intended to cover other wavelength ranges in the spectrum and are not limited to the visual spectrum.

The proximity sensor has been described with reference to simple low cost system, although it will be appreciated that the laser ranging and 3D camera technologies discussed above, could be also be used.

Although SPADs are most suited for use with the present invention, any other form of proximity detection for object location can potentially be used.

The input device of the present disclosure comprises a processor, an illumination source and a proximity detector, preferably a SPAD. In use the illumination source and the proximity detector are used to provide an output indicative of the proximity of an object to the detector.

The processor is then used to convert the output from the proximity detector into a control signal which can be used by the parent device affect an action or control or generate an input of the type typically generated by a mouse or a keyboard. The processor can comprises software/firmware located in the parent device or software/firmware located within an assembly which houses the illumination source and proximity detector, or any mix thereof.

Figure 4:
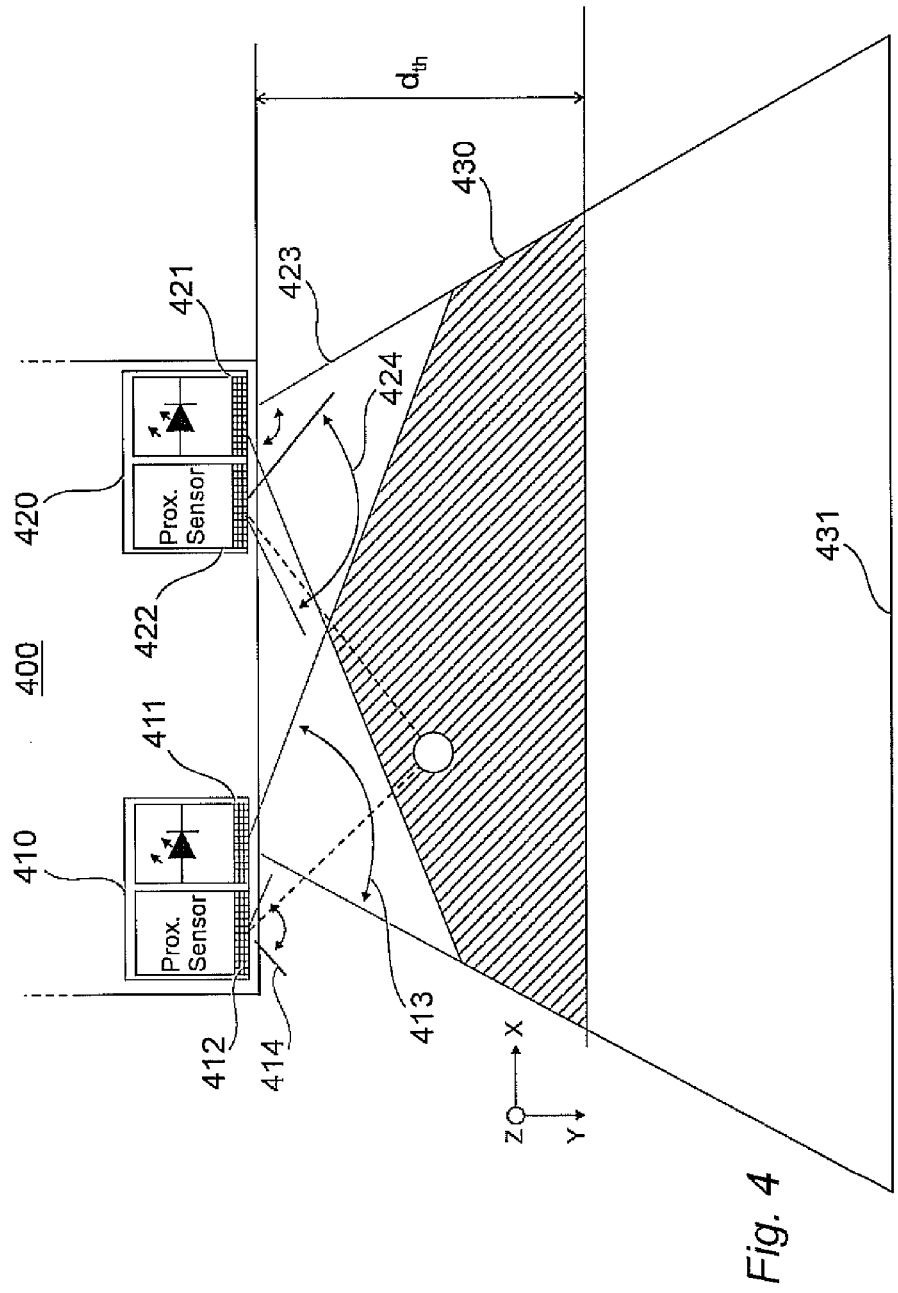
FIG. 4 is a diagram of an input device in accordance with an embodiment of the invention.

Preferably, as shown in FIG. 4, the input device comprises two assemblies 410, 420. An illumination source 411, 421 and a proximity detector 412, 422 is mounted on each assembly 410, 420, so that each assembly comprises a proximity detector—illumination source pair mounted next to each other and facing the same direction. The assemblies 410, 420 are mounted on a parent device 400 such that the illumination sources 411, 421 and proximity detectors 412, 422 share a common axis which is defined as the x-axis. The assemblies 410, 420 can be located at or close to the edges of the parent device 400. Additional assemblies can be used to provide redundancy in the system and if necessary to increase the accuracy of the system.

Alternatively, the proximity detectors 412, 422 and illumination sources 411, 421 can be mounted directly to the parent device providing their positions relative to each other are known. Preferably, proximity detectors 412, 422 and illumination sources 411, 421 are arranged in proximity detector—illumination source pairs each pair comprising a proximity detector and illumination source mounted next to each other and facing the same direction.

The illumination sources 411, 421 and proximity detectors 412, 422 are oriented so as to be aligned with an illumination plane and a sensing plane. Both the illumination and sensing plane are aligned with the plane of the device display. In addition, the illumination sources 411, 421 and proximity detectors 412, 422 are positioned to optimise the intensity of the projected and detected light respectively in this plane. This is achieved by providing the proximity sensors 412, 422 and illumination sources 411, 421 with cylindrical optics which focus the field of illumination and the field of reception into a field of view which is wide in the X-Y dimensions and narrow in the Z-dimension.

The area where the fields of illumination 413, 423 from the illumination sources and the fields of view 414, 424 (the field in which a proximity detector can detect an object) of the proximity detectors 412, 422 overlap forms an object sensing area 430. The extent of the object sensing area 430 along the y-axis (i.e. the distance between the parent device 400 and the edge 431 of object sensing area 430 furthest from the parent device 400) is determined by the range of the proximity detectors 412, 422 being used and the intensity of illumination provided by the illumination sources 411, 421. The width of the sensing area 430 is determined by the angles of the fields of illumination 413, 423 and the fields of reception 414, 424. Thus, the wider the angles of the fields of illumination 413, 423 and the fields of reception 414, 424, the greater the width of the sensing area 430. As a result, the size of the sensing area 430 need not be linked to, and can be larger than, the display area of a device because the size of the sensing area 430 is determined by the proximity detectors 412, 422, illumination sources 411, 421 and their optics.

The proximity of the sensing area 430 to the parent device 400 is determined by the angles of the fields of illumination 413, 423 and the fields of reception 414, 424. The wider the angles of the fields of illumination 413, 423 and the fields of reception 414, 424, the closer the sensing area 430 will be to the parent device. Thus for fixed positions and angles of the illumination sources 411, 421 and proximity detectors 412, 422, if the fields of illumination 413, 423 and reception 414, 424 are wider, then the area where the fields overlap each other will be closer to the device.

In one embodiment the object sensing area is a virtual space which does not require a screen or any components. The illumination is directed to a surface, number of surfaces or free space which constitutes a background scene. The number of photons detected by the proximity detectors 412, 422, which are reflected from the background scene, can be determined using the optical power density of the illumination sources 411, 421. The number of photons reflected from the background can then be used to determine the average range and reflectivity of the background scene, which in turn can be used to compensate for the reflectivity of the background scene. The field of illumination (and the proximity detector field of view) can be adapted to the circumstances in which the parent device is being used. Control circuitry or processes may be included to enable manipulation of the fields of view for this purpose. Changing the fields of view will result in virtual screens of different shapes and sizes.

When an object 440 is placed in the object sensing area 430, each of the proximity detector 412, 422 detects the reflected light from the object 440 and outputs a distance to the point of light reflection on the object 440. These distances can then be used to triangulate the position of the object 440 within the sensing area 430. By recognizing the position of the object on the virtual screen or object sensing area the system can interpret a certain function. For example touching the virtual screen in a certain area may constitute a particular input for example a letter on a keyboard. In addition movement of the object may also be recognized and further determined. For example, movement of the object from one place to another may constitute a further input, such as might be the case with the tracker ball or mouse. Due to the nature of the detection of the reflected light from the object, movement upwards and downwards relative to the surface can also be detected and interpreted in a particular manner.

In one particular embodiment of the invention, the virtual screen or object sensing area can be used to recognize gestures in 1, 2 or 3 dimensions. The gestures could take the form of keypad entries by a single touch in predetermined locations; mouse like movement on the screen by moving the object from one point to another, where the movement is recognised; more complex movements in 2D or 3D which may be the basis of simple character recognition or gesture or shape recognition. All the above can be used to generate an input to the parent device which may then be acted upon.

The object may be a finger or thumb or other type of pointer or appropriate object. When gestures are being recognised these could be entered by several fingers or a combination of pointing devices FIG. 4 demonstrates the system operating with a 2-proximity detector configuration, where the sensing area 430 in the x-y direction is determined by the area enclosed by the overlap of the sensor fields of illumination 413, 423 and illumination fields of view 414, 424 and does not need to be related to any of the dimensions of the parent device.

The thickness of the sensing area 430 (i.e. the z-axis distance of the sensing area) should be as thin as possible so as to create a well defined sensing layer. With a thinner sensing area 430, there is a faster and better defined transition between the system detecting the presence or absence of an object when the object enters the sensing area 430. In addition, for given illumination sources 411, 421, the optical power density is increased by focusing the output onto a smaller sensing area 430. This has the result that the same number of photons can be collected by the sensor in a shorter period of time.

For illumination sources 411, 421 which use a laser with a 2° z-axis beam angle and a threshold distance $d_{th}$ of 20 cm the thickness of the sensing area 430 is between 3 mm and 4 mm and preferably 3.49 mm. For illumination sources 411, 421 which use Light Emitting Diodes (LEDs) having a 15° z-axis beam angle, the thickness of the sensing area 430 is between 20 mm and 30 mm and preferably 26.3 mm. The thickness of the sensing layer is determined by the z-axis beam angle of the illumination and sensing optics. The z-axis beam angle is determined by the proximity detectors 412, 422, illumination sources 411, 421 and their optics. The threshold distance $d_{th}$ is explained below in more detail.

For two or more assemblies or pairs, each assembly or pair is sequentially activated. In this way, an individual proximity detector and the illumination source that it is coupled with are both activated at the same time. While one assembly or pair is active the remaining assemblies are inactive. Thus, the active proximity detector will only receive reflected light from the illumination source it is coupled with and will not receive reflections from other illumination sources. In addition, there is an ambient sensing period where the proximity detectors 412, 422 are active and the illumination sources 411, 421 are inactive. This allows the proximity detectors 412, 422 to measure ambient light levels due of the lack of interference from competing illumination sources 411, 421.

The timing of the readings for each bin of a proximity detector, the readings for different proximity detectors and the start of the next frame are configurable by the I2C. In a preferred embodiment, each assembly or pair is active for 100 ns (50 ns for bin A and 50 ns for bin B). In addition, the ambient sensing period is preferably 50 ns.

Preferably, the illumination sources 411, 421 emit non-visible light—i.e. electromagnetic radiation with is outside the visible spectrum (e.g. infrared light).

Preferably the proximity detectors 412, 422 are provided with a colour filter to filter out light which has not been generated by an illumination source coupled to a proximity detector Given that the light which has been reflected from an object will have a different phase to that which has not been reflected, the proximity detectors 412, 422 can be provided with phase plates selected to filter out light having a phase which indicates it is not reflected from an object within the sensing area 430. When an object 440 enters the sensing area 430, light from the currently active illumination source will be reflected from the object to the currently active proximity detector. The currently active proximity detector will then report a value indicative of the distance to the object. This value can then be used to calculate the distance of the object from the sensor. For example, this calculation can be performed as discussed above in relation to an SPAD proximity detector. By cycling through each of the assemblies in turn, a value indicative of the distance to the object, and in turn the actual distance to the object, can be obtained from each proximity detector.

Each proximity detector—illumination source assembly or pair can have wavelength matched colour filters to reduce or eliminate interference from other detector—illumination source assemblies or pairs. Filtering out wavelengths from other proximity detector—illumination source assemblies or pairs allows the binning sequences for all proximity detectors to be run simultaneously as the filters remove sources of interference. Frame rate can thus be increased at the cost of power consumption with simultaneous sensor binning (as illumination sources will all be on simultaneously rather than sequentially and the illumination sources are the dominant consumer of power in the system).

In the case of two assemblies 410, 420 (or two pairs), two distances ($r_1$ and $r_2$) are obtained. Using the distance between the sensors (d) it is then possible to calculate the position of the object 440 in relation to the parent device 400. In the present embodiment of FIG. 4, $r_1$ is the distance from a first proximity detector 412 to the object 440. The first proximity detector 412 defines the origin of a Cartesian coordinate plane, and $r_2$ is the distance to the object 440 from a second proximity detector 422 in FIG. 4. The first proximity detector 412 and second proximity detector 422 lie on a line which defines the x-axis of the Cartesian coordinate plane, and d is the distance between the first proximity detector 412 and the second proximity detector 422.

In this case, the Cartesian coordinates of the position the object's 440 relative to the parent device 400 can then be calculated from the following equations:

$$x = \frac{r_1^2 - r_2^2 + d^2}{2d}$$

$$y = \sqrt{r_1^2 - \left(\frac{r_1^2 - r_2^2 + d^2}{2d}\right)^2}$$

The position of the object 440 in relation to the parent device can be computed using the processing means or circuitry via software or firmware in the parent device 400 or, for systems comprising assemblies, via software or firmware embedded within one or more of the assemblies, or any mix thereof.

The calculated Cartesian co-ordinates of the location of the object 440 are given as x and y. Reflections from objects 440 having a distance greater than a threshold distance $d_{th}$ from the x-axis (where distance is measured parallel to the y-axis) are rejected to eliminate background objects generating unwanted input to the parent device. The threshold distance $d_{th}$ can be selected based on the application. For example, for a mobile device, such as a mobile telephone the device would probably be close to the user and therefore a short $d_{th}$ (e.g. 20 cm) is appropriate. For other devices different threshold distances will be more appropriate.

The co-ordinates output by the system can then be used by the parent device 400 in a similar manner to the output from a conventional touch screen to provide the appropriate control of the user interface of the parent device 400. Similarly relative movement between one of more touch with the object can be used to determine a first location, a second location and the distance between them. In addition, the time between the distance measurements for the two locations can enable the speed of movement to be detected. Again these measures may all serve as inputs for the parent device.

As the dimensions of the sensing area 430 are decoupled from the dimensions of the parent device 400 a much larger sensing area 430 can be provided than has been previously been possible for a touch screen or a track pad.

The proposed input device can also support variable sensitivity settings which can be implemented by changing the mapping of the virtual touch screen movement to the parent device display. For example, the input device can be configured such that an object moving from the left edge of the detection area to the right edge only moves the cursor on the parent device halfway across the display of a parent device. The speed at which the detected object moves across the sensing area 430 may be used to automatically modulate the sensitivity of the system, allowing fast swipes to move the cursor further for ease of operation and slower swipes for more precise control. This enables more accurate positioning than a touch screen user interface because of the 1:1 mapping required by a touch screen interface and aforementioned touching object size and user view obstruction issues. The proposed input device is also more accurate than a track pad based solution, because the input device allows for the provision of a larger sensing area than is possible for a track pad. This in turn allows for a lower movement sensitivity to be practical in the input device, thus requiring less fine motor controls.

As the input device does not require a user to make contact with the particular area or display, it is more comfortable to use over extended periods of time.

If the assemblies 410, 420 are located on an edge of a parent device which faces downwards in use, during normal use the sensing area 430 will be directed downwards and will thus be less susceptible to interference from external illumination sources above the parent device, such as sunlight etc. By edge it is meant a portion of the surface connecting the front face of the parent device (i.e. the face comprising a display) to the rear face (i.e. the face which lies in a plane substantially parallel to the front face), wherein the portion of the surface which is the edge lies in a plane which is not parallel to the front face of the parent device.

In addition it is possible to locate two or more assemblies on each edge at the perimeter of the face of the parent device, such that two or more assemblies will face downwards in use, no matter how the parent device is held.

It will be appreciated that many variations of the invention could apply and are intended to be encompassed within the scope of the claims. For example, two or more assemblies need not be located on the bottom edge of a parent device and may be located so that the sensing area overlays a front face of the parent device.

In addition, it is possible that more than one object can be detected at a time. Thus, one finger can be used to control the position of a pointer on the display of the parent device, while another finger can be used to perform an action such as selecting an icon on the display which is highlighted or pointed to by the pointer. Furthermore, a detected object which remains stationary for a certain period of time could also be used as a method of selecting icons or commands.

In addition, the sensing area 430 may be divided into regions providing different functionality. For example, movement at the bottom and one side edge may be used for scrolling purposes and the other side edge may be used for zoom.

Gesture recognition can also be used to trigger additional commands with movements in specific patterns. For example, clockwise circular motion for forward and anti-clockwise circular motion for back commands in an internet browser.

It will also be appreciated that the input device described herein can be used with a large number of parent devices. For example the input device can be used in a mobile phone, laptop, personal computer, server, smart phone, game console, tablet computer, personal digital assistant (PDA), camera, or a digital audio player. The input device can also be used in other types of environment where a key pad is used, for example access systems to a building or other location, biometric sensors etc.

That which is claimed is:

1. An input device for an electronic device comprising:
    first and second proximity detectors being spaced apart at peripheral edges of the electronic device, each detector comprising a single photon avalanche diode (SPAD);
    a light source configured to transmit light with a plurality of different modulation frequencies to a sensing area, which is reflected back to the first and second proximity detectors based upon an object being in the sensing area;
    the first and second proximity detectors configured to produce an output indicative of first and second distances of the object from the first and second proximity detectors, respectively; and
    a processor configured to calculate a two dimensional position of the object based upon the first distance, the second distance, a distance between the first and second proximity detectors, and operating said light source with the plurality of different modulation frequencies.

2. The input device of claim 1, wherein the processor is configured to provide the two dimensional position of the object as Cartesian coordinates of a plane having its origin located at the first proximity detector, wherein an x-axis passes through the second proximity detector.

3. The input device of claim 2, wherein an x-coordinate of the object is given by $$\frac{r_1^2 - r_2^2 + d^2}{2d}$$

and a y-coordinate of the object is given by $$\sqrt{r_1^2 - \left(\frac{r_1^2 - r_2^2 + d^2}{2d}\right)^2}$$

wherein r1 is the first distance, r2 is the second distance and d is the distance between the first and second proximity detectors.

4. The input device of claim 1, wherein each of the first and second proximity detectors comprises an array of single photon avalanche diodes.

5. The input device of claim 4, wherein the array of single photon avalanche diodes comprises a plurality of single photon avalanche diodes arranged in rows and columns.

6. The input device of claim 4, further comprising a counter to enable measurement of reflected illumination coupled to the array of single photon avalanche diodes.

7. The input device of claim 1, wherein the output from the first and second proximity detectors is configured to be passed to an operating system of the electronic device.

8. The input device of claim 1, wherein each of the first and second proximity detectors is configured to detect a phase of light which is reflected by the object.

9. The input device of claim 1, wherein the light source comprises a first light source associated with the first proximity detector and positioned adjacent thereto, and a second light source associated with the second proximity detector and positioned adjacent thereto.

10. The input device of claim 9, further comprising a processor configured to sequentially activate the first and second proximity detectors, and the first and second light sources.

11. The input device of claim 9, wherein each of the first and second proximity detectors includes a color filter.

12. The input device of claim 9, wherein the first and second proximity detectors and the first and second light sources include wavelength matched color filters for filtering out wavelengths from light sources associated with other proximity detectors.

13. The input device of claim 9, wherein each of the first and second proximity detectors further comprises a phase plate.

14. The input device of claim 9, wherein the first and second light sources are configured to emit non-visible light.

15. An electronic device comprising:
an input device comprising
first and second proximity detectors being spaced apart at peripheral edges of the electronic device, each detector comprising a single photon avalanche diode (SPAD), and a light source configured to transmit light with a plurality of different modulation frequencies to a sensing area, which is reflected back to the first and second proximity detectors based upon an object being in the sensing area, the first and second proximity detectors configured to produce an output indicative of first and second distances of the object from the first and second proximity detectors, respectively; and a processor coupled to the input device and configured to calculate a two dimensional position of the object based upon the first distance, the second distance, a distance between the first and second proximity detectors, and operating said light source with the plurality of different modulation frequencies.

16. The electronic device of claim 15, wherein the electronic device is configured to define a computer.

17. The electronic device of claim 15, wherein the electronic device is configured to define a mobile wireless communications device.

18. The electronic device of claim 15, wherein the processor is configured to provide the two dimensional position of the object as Cartesian coordinates of a plane having its origin located at the first proximity detector, wherein an x-axis passes through the second proximity detector.

19. A method of controlling a device using an input device comprising first and second proximity detectors and a light source, the first and second proximity detectors each comprising a single photon avalanche diode and being spaced apart at peripheral edges of the device, the method comprising:
transmitting light with a plurality of different modulation frequencies from a light source to a sensing area;
receiving at the first and second proximity detectors at the peripheral edges of the device light reflected by an object in the sensing area;
generating an output indicative of first and second distances of the object from the first and second proximity detectors, respectively; and
calculating a two dimensional position of the object based upon the first distance, the second distance, a distance between the first and second proximity detectors, using a processor, and operating the light source with the plurality of different modulation frequencies.

20. The method of claim 19, wherein the calculating provides the two dimensional position of the object as Cartesian coordinates of a plane having its origin located at the first proximity detector, wherein an x-axis passes through the second proximity detector.

21. The method of claim 19, wherein an x-coordinate of the object is calculated by $$\frac{r_1^2 - r_2^2 + d^2}{2d}$$

and a y-coordinate of the object is calculated by $$\sqrt{r_1^2 - \left(\frac{r_1^2 - r_2^2 + d^2}{2d}\right)^2}$$

wherein $r_1$ is the first distance, $r_2$ is the second distance and d is the distance between the first and second proximity detectors.

* * * * *